United States Patent [19]
Pullen et al.

[11] Patent Number: 6,038,228
[45] Date of Patent: Mar. 14, 2000

[54] PROCESSING CALL INFORMATION WITHIN A TELECOMMUNICATIONS NETWORK

[75] Inventors: Steve M. Pullen, Rowlett; Stephen A. James, Plano; Navdeep G. Singh, Plano; Shahrooz S. Kasrai, Plano, all of Tex.

[73] Assignee: Alcatel USA Sourcing, L.P., Plano, Tex.

[21] Appl. No.: 08/843,328

[22] Filed: Apr. 15, 1997

[51] Int. Cl.[7] .................................................. H04L 12/50
[52] U.S. Cl. ........................... 370/384; 370/522; 379/229
[58] Field of Search .................................. 370/522, 410, 370/404, 377, 384, 373, 376, 465; 379/229

[56] References Cited

U.S. PATENT DOCUMENTS

| | | | |
|---|---|---|---|
| 4,970,721 | 11/1990 | Aczel et al. | 370/92 |
| 5,390,241 | 2/1995 | Bales et al. | 370/522 |
| 5,477,530 | 12/1995 | Ahmadi et al. | 370/404 |
| 5,495,484 | 2/1996 | Self et al. | 370/110.1 |
| 5,732,070 | 3/1998 | Hiroki | 370/522 |
| 5,835,497 | 11/1998 | Litzenberger et al. | 370/522 |

FOREIGN PATENT DOCUMENTS

| | | | |
|---|---|---|---|
| 0016426 | 10/1980 | European Pat. Off. | H04Q 11/04 |
| 0480634 | 4/1992 | European Pat. Off. | H04Q 11/04 |
| 0658062 | 6/1995 | European Pat. Off. | H04Q 3/58 |
| 0766487 | 4/1997 | European Pat. Off. | H04Q 3/545 |

OTHER PUBLICATIONS

S. Uchiyama, et al., "An Environment for Supplementary Service Development", ISS '95, World Telecommunications Congress, vol. 1, No. SYMP. 15, Apr. 23, 1995, pp. 88–92.

F. Dolenc, "Switch Architecture for Intelligent Networks", International Switching Symposium—Paper B8.7, vol. 5, May 28, 1990—Jun. 1, 1990, pp. 171–176.

A. Nakajima, et al., "A Hierarchial Process Management for a Processor Pool Network", Computer Technologies for the 90's, Oct. 30, 1988, pp. 213–217.

J. Pons, et al., "Organisation Multimicroprocesseur Spécialisée: Un Autocommutateur Téléphonique", Congrés Afcet Théorie Et Techniques De L'Informatique, Nov. 13–15, 1978, pp. 116–123.

J. Martin, "System X", Post Office Electrical Engineers Journal, vol. 71, Jan. 1979, pp. 221–224.

F. Anceau, et al., "Project of an Architecture for the Command of an Electronic Switching System", International Switching Symposium–Session 30B, vol. 2, May 7–11, 1979, pp. 608–614.

*Primary Examiner*—Hassan Kizou
*Assistant Examiner*—Daniel Previl
*Attorney, Agent, or Firm*—Baker Botts L.L.P.

[57] ABSTRACT

A system (10) is provided for processing call information within a telecommunications network. The processing system includes a plurality of functional modules (34–54). Each functional module (34–54) can perform a corresponding function of call processing. A call sequencer module (32) is operable to communicate with each functional module (34–54). The call sequencer module (32) is operable to invoke a particular functional module (34–54) whenever the function of call processing corresponding to that functional module (34–54) is required to be performed.

2 Claims, 2 Drawing Sheets

PROCESSING CALL INFORMATION WITHIN A TELECOMMUNICATIONS NETWORK

TECHNICAL FIELD OF THE INVENTION

The present invention relates in general to the field of telecommunications. More particularly, the present invention relates to a system and method for processing call information within a telecommunications network.

BACKGROUND OF THE INVENTION

In a modern telecommunications network, a considerable amount of processing must be performed in order to deliver and otherwise support a call between a calling (origination) party and a called (termination) party. Information relating to a call may be formatted according to any one of a number of call models (e.g, MCI, CS1, or Advanced Intelligent Network (AIN)) and received over lines operating under any one of a number of call protocols (e.g., Inband, Integrated Services Digital Network (ISDN), or Signaling System No. 7 (SS7)). Each call model is unique so that the processing that is performed pursuant to one call model differs from that which is performed pursuant to any other call model. Similarly, each call protocol is unique so that processing varies from one protocol to another.

In previous systems and techniques for performing call processing, a separate software routine was provided for each combination of call model and call protocol. For example, in a typical prior system, one software routine was provided for Inband call protocol and MCI call model, another routine was provided for Inband call protocol and CS1 call model, and yet another software routine was provided for Inband call protocol and AIN call model. Furthermore, another software routine would be provided for ISDN call protocol and MCI call model, yet another for ISDN call protocol and CS1 model, and still another for ISDN call protocol and AIN call model. Yet another three software routine would be provided to support the combination of SS7 protocol with each of the MCI, CS1 and AIN call models. As such, a large amount of redundancy was present in previous systems and techniques. This redundancy consumed valuable resources, such as memory and processing facilities. Furthermore, maintenance for previous systems was complicated by the redundancy. More specifically, in order to modify these systems to incorporate updates to a particular call model or call protocol, each separate routine that was provided for such call protocol or call model had to be changed separately.

Also, previous systems and techniques were unable to originate a call according to one call model/call protocol combination and terminate the same call according to another call model/call protocol combination. For example, a call originating under an MCI call model and ISDN call protocol could not be terminated under a CS1 call model and ISDN call protocol. Thus, prior systems and techniques were limited in application.

Furthermore, in previous telecommunications networks, various elements were dedicated to processing information for calls received over specific group of lines or trunks. For example, a first element would perform processing for calls received over lines 1–1,000, a second element would perform processing for calls received over lines 1,001–2,000, a third element would perform processing for calls received over lines 2,001–3,000, etc. Call information for a particular call could only be handled at the element servicing the line over which the call was received. Thus, if a particular element had an inordinate amount of traffic thereon, other hardware elements were not able to take up some of the processing load.

SUMMARY OF THE INVENTION

In accordance with the present invention, a system and method for processing call information in a telecommunications network are provided which substantially eliminate or reduce disadvantages and problems associated with prior techniques.

In one aspect of the present invention, a system is provided for processing call information within a telecommunications network. The processing system includes a plurality of functional modules. Each functional module can perform a corresponding function of call processing. A call sequencer module is operable to communicate with each functional module. The call sequencer module is operable to invoke a particular functional module whenever the function of call processing corresponding to that functional module is required to be performed.

In another aspect of the present invention, a system is provided for processing call information within a telecommunications network. The processing system comprises a first call processing unit having a first functional module operable to communicate with a first call sequencer module. The first functional module is operable to perform a corresponding function of call processing. The first call sequencer module is operable to invoke the first functional module whenever the function of call processing corresponding to the first functional module is required to be performed by the first call processing unit. A second call processing unit has a second functional module operable to communicate with a second call sequencer module. The second functional module is operable to perform a corresponding function of call processing. The second call sequencer module is operable to invoke the second functional module whenever the function of call processing corresponding to the second functional module is required to be performed by the second call processing unit. A call block memory is accessible by the first call processing unit and the second call processing unit. The call block memory stores information generated during processing within either the first call processing unit or the second call processing unit.

In yet another aspect of the present invention, a method is provided for processing call information within a telecommunications network. In the method, call information relating to a call is received. One of a plurality of functional modules is invoked in response to the call information. Each of these functional modules is operable to perform a corresponding function of call processing. The function of call processing corresponding to the invoked functional module is performed.

An important technical advantage of the present invention includes providing a plurality of discrete functional modules to perform all the call processing necessary to deliver and otherwise support a call. Each functional module operates independently of the other functional modules, and comprises coding to perform a specific function or group of functions. Accordingly, the present invention substantially reduces redundancy within a telecommunications network because the coding for performing a certain function does not need to be provided in multiple routines (wherein each routine is specific to a particular case, such as a particular combination of call model and call protocol). Rather, whenever a particular function is required to be performed, the appropriate functional module can be invoked. Thus, the present invention conserves processing resources. Furthermore, only a single functional module needs to be modified in order to update software, thereby facilitating the maintenance of a telecommunications system.

Another important technical advantage of the present invention includes originating a call according to one call protocol/call model combination and terminating the same call according to another call protocol/call model combination. This is accomplished by providing separate functional modules for various call protocols, such as Inband, Integrated Services Digital Network (ISDN), and Signaling System No. 7 (SS7) call protocols, and various call models, such as Advanced Intelligent Network (AIN), CS1, and MCI call models. Call processing for origination may be performed with one combination of call protocol module and call model module. Call processing for termination may then be performed with another combination of call protocol module and call model module.

Yet another important technical advantage of the present invention includes providing a plurality of call processing units having access to the same call block memory. Information that is to be processed, has been processed, or generated as a result of processing may be contained within the call block memory. Each call processing unit may access the information within the shared call block memory via a respective coupling. Thus, if one call processing unit is busy or otherwise unavailable, the information within the call block memory may be received at another call processing unit for processing.

Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals used for like and corresponding parts of the various drawings.

Figure 1:
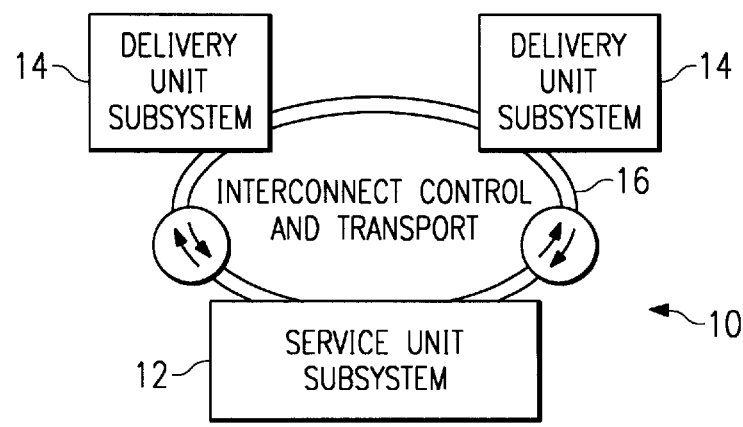
FIG. 1 illustrates a block diagram of a distributed telecommunications switching system in which the present invention may be incorporated.

FIG. 1 is a block diagram of a distributed telecommunications switching system 10 in which the present invention may be incorporated. Generally, distributed telecommunications switching system 10 may support a variety of communications, including, but not limited to, local telephony, toll (i.e., long distance), wireless, intelligent network (IN), and residential video.

Distributed telecommunications switching system 10 includes a service unit subsystem 12. Although a single service unit subsystem 12 is shown, it should be understood that in other embodiments, distributed telecommunications switching system 10 may include a plurality of service unit subsystems 12. Service unit subsystem 12 provides a centralized control for services, connection, operations, administration, and maintenance within distributed telecommunications switching system 10, and also external signaling interfaces to other switching systems. In one embodiment, service unit subsystem 12 provides control and management on an advanced intelligent network (AIN) service platform using information network architecture (INA) software design principles. As described below in more detail, service unit subsystem 12 performs processing for call information related to calls received and switched within distributed telecommunications switching system 10. Such processing includes that which is required by various call models and call protocols. The functionality of service unit subsystem 12 may be supported by a processor, such as a main-frame, file server, work station, or other suitable data processing facility running appropriate software. For example, a SUN™ operating system may be utilized for service unit subsystem 12.

One or more delivery unit subsystems 14 support the switching functionality of distributed telecommunications switching system 10, and, accordingly, may comprise suitable switching fabric. Each delivery unit subsystem 14 operates under the control and direction of service unit subsystem 12 to provide the message transport mechanism for call information. Each delivery unit subsystem 14 may be coupled to one or more incoming trunks and lines over which call information can be received. Each trunk or line is operated according to a particular call protocol (e.g., Inband, Integrated Services Digital Network (ISDN), or Signaling System No. 7 (SS7)) and a particular call model (e.g., Advanced Intelligent Network (AIN), CS1, or MCI). Delivery unit subsystems 14 can support a multitude of services, such as broadband interfacing, cable applications, telephony interfacing, and personal communication services. Each delivery subsystem 14 may be dedicated to a specific type of service or multiple services may be accommodated within a single delivery unit subsystem 14.

Service unit subsystem 12 and delivery unit subsystems 14 of distributed telecommunications switching system 10 may be geographically grouped within a single area or geographically dispersed in several remote areas while maintaining the distributed nature of the switching function performed. Service unit subsystem 12 and delivery unit subsystems 14 can be coupled by, and communicate through, a suitable link, such as a fiber optic ring 16 supporting a Synchronous Optical NETwork (SONET) standard. In one embodiment, call information is transported between service unit subsystem 12 and delivery unit subsystems 14 on fiber optic ring 16 in asynchronous transfer mode (ATM) cell format. Accordingly, interfacing between fiber optic ring 16 and each of service unit subsystem 12 and delivery unit subsystems 14 may be supported by an ATM add/drop multiplexer. Information received by and transmitted from delivery unit subsystem 14 can be time-slot interchanged prior to and after transmission to and from fiber optic ring 16.

Within distributed telecommunications switching system 10, service unit subsystem 12 provides the control and management functions and is separate from the transport mechanism and switching function of delivery unit subsystems 14. This separation of functionality allows service unit subsystem 12 and delivery units subsystem 14 to independently evolve and be upgraded to support new services or new technologies for unique enhancements to each. Service unit subsystem 12 can support multiple types of delivery unit subsystems 14 that can provide multiple services including broadband, video, conventional telephone, and personal communications services.

An exemplary distributed telecommunications switching system is described in more detail in U.S. Pat. No. 5,495,484, issued to Self et al., on Feb. 27, 1996, the entire disclosure of which is incorporated herein by reference.

With regard to the present invention, distributed telecommunications switching system 10 generally operates as follows. Call information for a particular call can be received over an originating line at any of delivery unit subsystems 14. Fiber optic ring 16 transports the call information from the receiving delivery unit subsystem 14 to service unit subsystem 12. Service unit subsystem 12 performs suitable processing upon the call information to support the call. For example, this processing includes creating and maintaining a billing record, interpreting a digit stream to support international dialing (i.e., pre-translation), and any processing required by various protocols and call models, such as authorizing an origination attempt, analyzing the call information, etc. Service unit subsystem 12 also generates resultant information during processing of the call information. The resultant information may specify, among other things, a terminating line for the call. Such terminating line may be coupled to the same or a separate delivery unit subsystem 14 to which the originating line is coupled. The resultant information is conveyed to the delivery unit subsystem 14 connected to the originating line (over which call information was received), and, if appropriate, to a separate delivery unit subsystem 14 connected to the specified terminating line. The resultant information directs the delivery unit subsystem(s) to complete the connection of the call.

Figure 2:
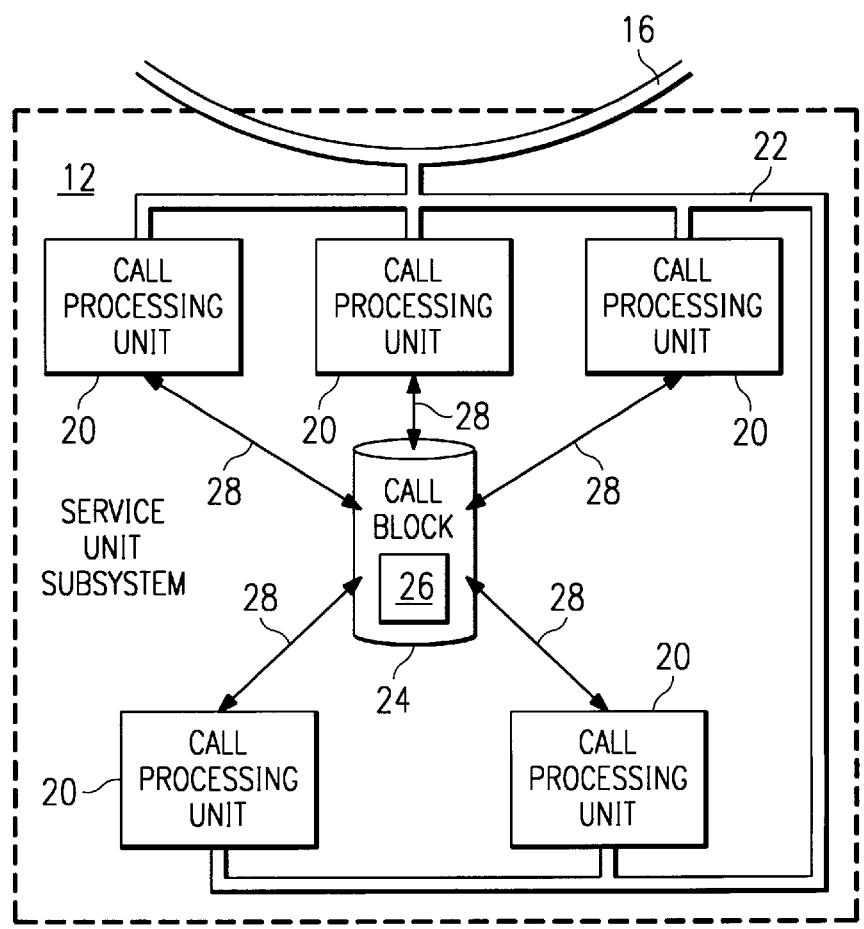
FIG. 2 illustrates a block diagram of an exemplary service unit subsystem, according to an embodiment of the present invention.

FIG. 2 illustrates a block diagram of an exemplary service unit subsystem 12, according to an embodiment of the present invention. As described above, service unit subsystem 12 provides a centralized control for services, connection, operations, administration, and maintenance within distributed telecommunications switching system 10, and also external signaling interfaces to other switching systems.

Service unit subsystem 12 comprises one or more call processing units 20 coupled to fiber optic link 16 via a link 22. Link 22, which can be a bus or any other suitable link, functions primarily to convey call and resultant information between a number of call processing units 20 and fiber optic link 16.

Each call processing unit 20 may perform a multitude of call processing operations upon call information received over fiber optic link 16. These processing functions include interpreting various call protocols (e.g., Inband, ISDN, and SS7), processing according to various call models (e.g., AIN, CS1, and MCI), generating and maintaining billing records, translation, and interpreting a digit stream to support international dialing. Call processing units 20 generate resultant information in response to the received call information. Each call processing unit 20 operates independently of the other call processing units 20. The functionality of each call processing unit 20 may be performed by a processor, such as a main-frame, file server, work station or other suitable data processing facility running appropriate software. An exemplary call processing unit 20 is shown and described in more detail below with reference to FIG. 3.

The number of call processing units 20 provided in a service unit subsystem 12 is configurable. Thus, although five call processing units 20 are shown in FIG. 2, in other embodiments a service unit subsystem 12 may include any other suitable number of call processing unit 20. The number can be selected based upon various factors, such as the amount of call traffic handled by service unit subsystem 12, hardware implementation choices, desired redundancy, etc. For example, in one embodiment, service unit subsystem 12 may be implemented in part on a SUN™ operating system which comprises four separate processing facilities; accordingly, four processing units 20 may be provided or supported in such a service unit subsystem 12. Furthermore, in some embodiments, one call processing unit 20 may be provided as a backup for another call processing unit 20. In such case, both call processing units 20 perform duplicative operations upon call information received from fiber optic link 16. If one call processing unit 20 should fail or otherwise become unavailable, processing continues at the other call processing unit 20. Preferably, the number of call processing units 20 will be one higher than the number necessary to support the greatest amount of call traffic expected at distributed telecommunications switching system 10, the extra call processing unit 20 being provided for redundancy.

A call block memory 24 is shared, and can be accessed, by each call processing unit 20 within service unit subsystem 12. Call block memory 24 may reside in a suitable storage medium, such as a random access memory (RAM), disk, tape storage, or other suitable data storage system. Call block memory 24 functions to receive, store, and forward information 26. Because call block memory 24 is linked to each call processing unit 20 via a corresponding connection 28, the same information 26 is available to each call processing unit 20.

In operation, call information for a particular call is received at service unit subsystem 12 via optical link 16. Link 22 conveys the call information to any one or more call processing units 20 for processing. In one embodiment, multiple call processing units 20 may perform the same operations upon the received information, at least one call processing unit 20 acting as an redundant backup for another call processing unit 20. As the call information is processed within a call processing unit 20, information 26 is generated, stored within and retrieved from call block memory 24; this information 26 is altered throughout the processing of call information. If necessary, another call processing unit 20 may operate upon information 26 to complete processing of the call information. After all necessary processing has been performed, information 26 within call block memory 24 constitutes resultant information. The resultant information is placed on fiber optic link 16 via bus 22.

Figure 3:
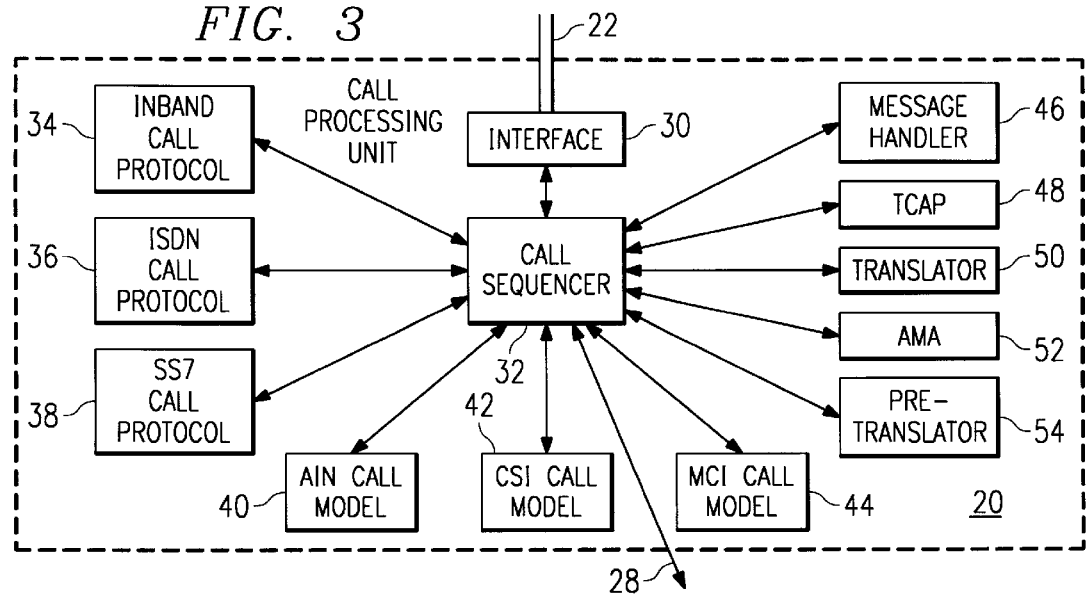
FIG. 3 illustrates a block diagram of an exemplary call processing unit, according to an embodiment of the present invention.

FIG. 3 illustrates a block diagram of an exemplary call processing unit 20, according to an embodiment of the present invention. Call processing unit 20 comprises an interface 30. Interface 30 is coupled to link 22 within a service unit subsystem 12, as shown in FIG. 1. Interface 30 functions to receive and transmit information (including call information and resultant information) between call processing unit 20 and delivery unit subsystems 14. Interface 30 converts information received from fiber optic link 16 into a form that can be used in call processing unit 20. Likewise, interface 30 converts information generated within call processing unit 20 into a form which can be carried over fiber optic link 16. Interface 30 may comprise any suitable interface. For example, in one embodiment, interface 30 includes an asynchronous transfer mode (ATM) add/drop multiplexer.

A call sequencer module 32 is operable to communicate with to interface 30. Call sequencer module 32 functions to route call information throughout call processing unit 20 and also to call block memory 24 of the service unit subsystem 12 within which call processing unit 20 is contained. For the purpose of routing, call sequencer module 32 may have access to a database (not shown) which contains information specifying the trunks and lines connected to each delivery unit subsystem 14 of distributed telecommunications switching system 10. Call sequencer module 32 also functions to invoke or call other modules with call processing unit 20, as described herein.

A plurality of functional modules 34–54 are each operable to communicate with call sequencer module 32. These functional modules 34–54 may be called or invoked by call sequencer module 32. Functional modules 34–54 cooperate to perform all necessary call processing for any call information received at call processing unit 20. In particular, each of functional modules 34–54 is operable to perform one or more functional operations upon, or in response to, the call information that is received at interface 30 and routed by call sequencer module 32. Each functional module 34–54 operates independently of the other functional modules within call processing unit 30. In one embodiment, each of functional modules 34–54 may comprise an object-oriented program. Preferably, each functional module 34–54 generates or outputs information 26 in a normalized form that can be used, interpreted, or otherwise processed by the other functional modules within call processing unit 20.

An Inband call protocol module 34, an Integrated Services Digital Network (ISDN) call protocol module 36, and a Signaling System No. 7 (SS7) call protocol module 38 are each operable to perform processing of call information as necessary to support a corresponding call protocol. This processing may include the extraction of information from an initial address message (IAM) within the call information, the generation and transmittal of an "address complete" message to the delivery unit 14 from which call information was received (i.e., the originating switch), and any other suitable processing pursuant to a specific call protocol. It should be understood that these call protocol modules 34–38 for supporting Inband, ISDN, and SS7 protocols, respectively, are provided by way of example only. In alternative embodiments, any other suitable call protocol module can be provided in combination with, or instead of, any or all of the exemplary call protocol modules 34–38 shown in FIG. 3.

An AIN call model 40, a CS1 call model 42, and an MCI call model 44 are each operable to perform processing upon call information as required by a corresponding call model. Call model processing comprises a sequence of processing according to the standards of a particular call model. A vendor or provider of telecommunications services, such as MCI, AT&T, GTE, SPRINT, etc, may establish the standards for a particular call model. Call module processing may include authorizing an origination attempt and analyzing call information. Each call model module 40–44 may include a first portion for call origination and a second portion for call termination. The origination call portion performs processing necessary to support that part of a call model processing sequence associated with the origination of a call. The termination call portion performs processing to support the part of a call model processing sequence associated with the termination of a call. The origination and termination call portions of each call model module 40–44 may operate independently. It should be understood that call models 40–44 are provided by way of example only. Thus, in alternative embodiments, any other suitable call model modules can be provided in combination with, or instead of, any or all of the previously listed call model modules 40–44.

For the call information of a particular call, any one or more of call protocol modules 34–38 can be used in conjunction with one or more of call model modules 40–44 to perform call processing. For example, ISDN call protocol module 36 can be operated with AIN call model module 40, CS1 call model module 42, or MCI call model module 44 to support a call in an AIN format, CS1 format, or MCI format, respectively, received over an ISDN line. Furthermore, because each of call model modules 40–44 comprise an origination portion and a termination portion, call processing unit 20 supports origination of a call according to a first call model, such as the MCI call model, and termination of the same call according to a second call model, such as the AIN call model. Thus, the present invention is capable of originating a call using one combination of call protocol/call model and terminating the same call using a different combination of call protocol/call model.

A message handler module 46, a transaction capability application part (TCAP) module 48, a translator module 50, an automatic message accounting (AMA) module 52, and a pre-translator module 54 each perform additional functions within call processing unit 20. For example, message handler module 46 formats information in one or more suitable formats to support communication between call processing unit 20 and other elements in distributed telecommunications switching system 10. TCAP module 48 supports a messaging protocol for Signaling System No. 7 (SS7). AMA module 52 performs processing to record and generate a billing record for a call in order to ensure accurate billing. Pre-translator module 54 interprets a specific digit stream within call information in order to support international dialing. Similar to call protocol modules 34–38 and call model modules 40–44 shown in FIG. 3, functional modules 46–54 are provided by way of example only. Thus, in alternative embodiments, call processing unit 20 may include any other suitable functional modules in addition to, or instead of, any or all of the functional modules 46–54. These other functional modules may support any other processing which may be performed upon, or in response to, call information. This processing may include encryption, decryption, authentication, registration, routing, etc.

Generally, when call information for a particular call is received at call processing unit 20, call sequencer module 32 sequentially invokes or calls various functional modules 34–54 to perform the processing required to deliver or otherwise support the call. It should be understood that not all functional modules 34–54 are used to perform processing for each call. When a particular functional module 34–54 has performed the operation for which it was invoked, that module may return information to shared call block memory 24 in a normalized form which can be used, interpreted, or otherwise processed by other functional modules 34–54 within call processing unit 20.

Within call processing unit 20, call processing is separated into a number of functional operations performed at discrete, independently operating functional modules 34–54. Whenever a particular function is required to be performed, the appropriate functional module 34–54 can be invoked. Thus, the present invention substantially reduces redundancy within a telecommunications network because the coding for performing a certain function does not need to be provided in multiple routines (wherein each routine is specific to a particular case, such as a particular combination of call model and call protocol). In this manner, the present invention conserves processing resources. Furthermore, only a single functional module needs to be modified in order to update software. Accordingly, the present invention facilitates the maintenance of a telecommunications system.

Furthermore, because information is stored within call block memory 24 within service unit subsystem 12, this information is readily available to other call processing units 20. Thus, if the functional module of one call processing unit 20 fails or ceases to operate properly or is busy, a similar functional module within another call processing unit 20 may be invoked to perform the necessary operation in order to advance the call processing.

Figure 4:
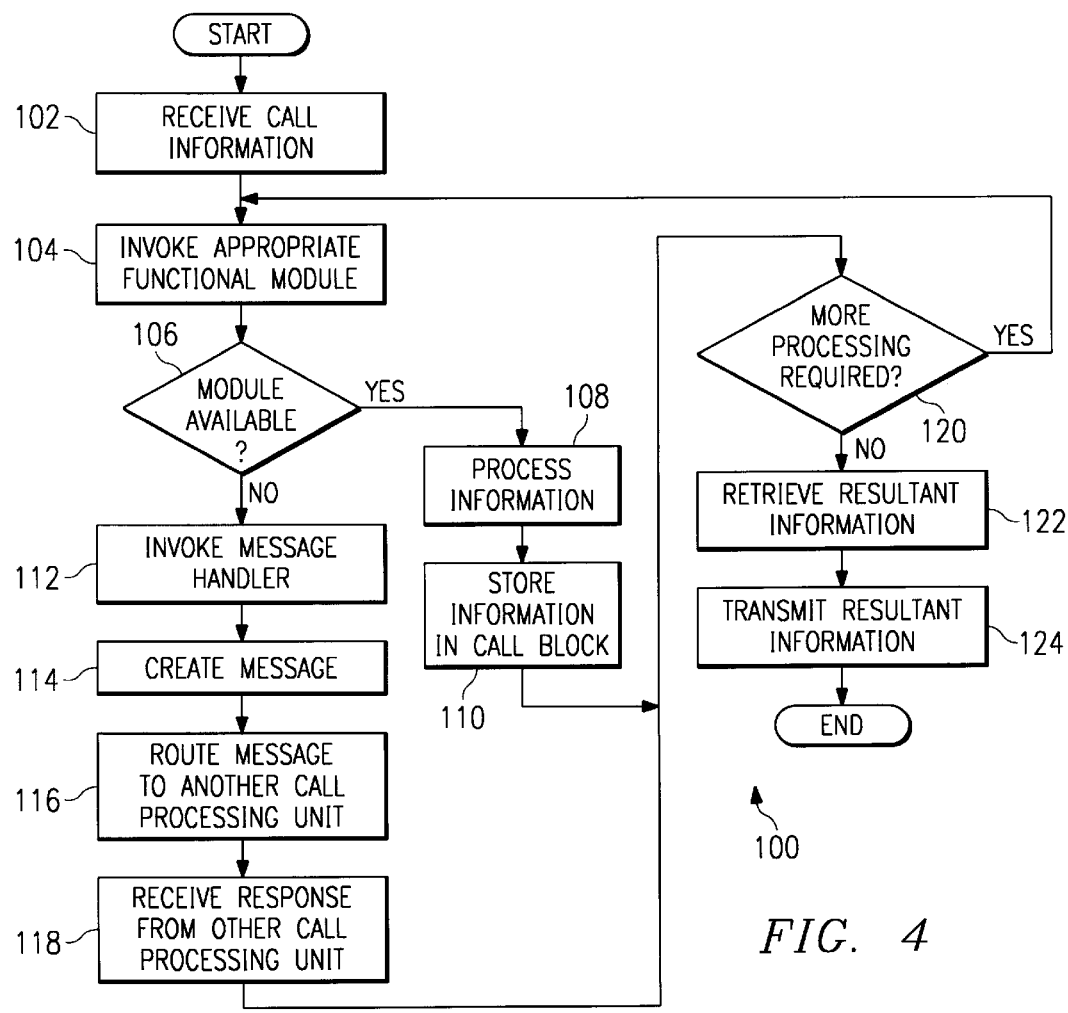
FIG. 4 is a flow chart of an exemplary method for processing call information, according to an embodiment of the present invention.

FIG. 4 is a flow chart of an exemplary method 100 for processing call information, according to an embodiment of the present invention. Method 100 may correspond to the operation of a call processing unit 20.

Method 100 begins at step 102 where call information relating to a particular call is received at interface 30 of call processing unit 20. Interface 30 converts the call information into a form suitable for use in call processing unit 20. The converted information is relayed to call sequencer module 32, which then may store some or all of the call information into call block memory 24 of service unit subsystem 12 within which call processing unit 20 is contained. At step 104, call sequencer module 32 calls or invokes an appropriate functional module 34–54 for processing the information by sending it the call information, for example, in the form of a message.

At step 106, call processing unit 20 determines whether the appropriate functional module 34–54 is available. If such functional module is available, then at step 108, the functional module performs call processing according to its defined operation. As a result of this processing, the functional module 34–54 may output information which has been normalized, and thus can be operated upon by other functional modules within call processing unit 20. At step 110, the normalized information is stored into call block 24. Method 100 then moves to step 120.

Referring again to step 106, if it is determined that the functional module 34–54 which was invoked is unavailable, then call processing unit 20 invokes message handler module 46 at step 112. At step 114, message handler module 46 creates a message for output by call processing unit 20. This message may specify information to be processed, and/or direct another call processing unit 20 to invoke a functional module to perform processing upon the information within call block memory 24. At step 116, the message created by message handler module 46 is routed to another call processing unit 20, which can be within the same or a separate service unit subsystem 12. At step 118, the call processing unit 20 which output the message receives a response from the call processing unit 20 which received the message. Such response may indicate that the desired processing has been completed at the latter call processing unit 20. Method 100 then moves to step 120.

At step 120, call processing unit 20 determines whether more call processing is required. If more processing is required, then call processing unit 20 returns to step 104 where call sequencer module 32 calls an appropriate functional module 34–54 to perform additional processing. Call processing unit 20 repeats steps 104–120 until it is determined at step 120 that no additional processing is required.

After all processing has been completed, information 26 within call block memory 24 constitutes resultant information. At step 122, the resultant information is retrieved from call block memory 24. At step 124 the resultant information is transmitted out of call processing unit 20 via link 22. This resultant information may then be used to complete and/or otherwise support a call between the desired origination and termination points. Method 100 then ends.

Although the present invention and its advantages have been described in detail, it should be understood that various changes, substitutions, and alterations can be made therein without departing from the spirit and scope of the invention as defined by the appended claims.

What is claimed is:

1. A system for processing call information within a telecommunications network, the processing system comprising:

a first call processing unit having a first functional module operable to communicate with a first call sequencer module, the first functional module operable to perform a corresponding function of call processing, the first call sequencer module operable to invoke the first functional module whenever the function of call processing corresponding to the first functional module is required to be performed by the first call processing unit;

a second call processing unit having a second functional module operable to communicate with a second call sequencer module, the second functional module operable to perform a corresponding function of call processing, the second call sequencer module operable to invoke the second functional module whenever the function of call processing corresponding to the second functional module is required to be performed by the second call processing unit; and a call block memory accessible by the first call processing unit and the second call processing unit, the call block memory operable to store information generated during processing within either the first call processing unit or the second call processing unit, wherein the first call processing unit and the second call processing unit cooperate to perform call processing for a single call.

2. A method for processing call information within a telecommunications network, the method comprising the steps of:

receiving call information relating to a call;

invoking a first one of a plurality of functional modules in response to the call information, each functional module operable to perform a corresponding function of call processing;

performing the function of call processing corresponding to the first invoked functional module;

determining whether additional call processing should be performed in response to the call information;

invoking a second one of the plurality of functional modules; and performing the function of additional call processing corresponding to the second invoked functional module.

* * * * *